US008874687B2

(12) United States Patent
Gupta et al.

(10) Patent No.: US 8,874,687 B2
(45) Date of Patent: Oct. 28, 2014

(54) SYSTEM AND METHOD FOR DYNAMICALLY MODIFYING CONTENT BASED ON USER EXPECTATIONS

(75) Inventors: Puneet Gupta, Bangalore (IN); Akshay Darbari, Allahabad (IN); Venkat Kumar Sivaramamurthy, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 203 days.

(21) Appl. No.: 13/225,031

(22) Filed: Sep. 2, 2011

(65) Prior Publication Data

US 2012/0259945 A1    Oct. 11, 2012

(30) Foreign Application Priority Data

Apr. 7, 2011    (IN) .............................. 1217/CHE/2011

(51) Int. Cl.
| | |
|---|---|
| *G06F 15/16* | (2006.01) |
| *H04L 29/08* | (2006.01) |
| *H04N 21/231* | (2011.01) |
| *H04N 21/2343* | (2011.01) |
| *H04N 21/258* | (2011.01) |
| *H04N 21/433* | (2011.01) |
| *H04N 21/4402* | (2011.01) |
| *H04N 21/442* | (2011.01) |
| *H04N 21/45* | (2011.01) |
| *H04N 21/4782* | (2011.01) |
| *H04N 21/61* | (2011.01) |

(52) U.S. Cl.
CPC ............ *H04L 67/306* (2013.01); *H04L 67/322* (2013.01); *H04N 21/23106* (2013.01); *H04N 21/2343* (2013.01); *H04N 21/25891* (2013.01); *H04N 21/4331* (2013.01); *H04N 21/4402* (2013.01); *H04N 21/44222* (2013.01); *H04N 21/4532* (2013.01); *H04N 21/4782* (2013.01); *H04N 21/6131* (2013.01)
USPC ........................... 709/217; 709/203; 709/231

(58) Field of Classification Search
USPC .................................................. 709/217, 219
See application file for complete search history.

(56) References Cited

U.S. PATENT DOCUMENTS 7,818,368 B2 * 10/2010 Yang et al. .................... 709/203
7,864,186 B2 *  1/2011 Robotham et al. ............ 345/581
(Continued)

OTHER PUBLICATIONS

Lopez, D. et al. "Adaptive Multimedia Streaming over IP Based on Customer Oriented Metrics," International Symposium on Computer Networks, 2006, pp. 185-191.*

(Continued)

*Primary Examiner* — Melvin H Pollack
(74) *Attorney, Agent, or Firm* — LeClairRyan, a Professional Corporation

(57) ABSTRACT

Systems and methods for dynamically rendering content based on user expectations and user tolerance levels are disclosed. Content is delivered to a user in a way that maximizes user experience and minimizes frustration while accessing web content. Because every user's expectations and tolerance levels are different, embodiments of the invention exploit these two parameters to deliver optimized web content to users within an acceptable time frame, thus ensuring a better browsing experience. In one embodiment of the invention, the method includes intercepting at a computing device a request for content from a server, determining a quality of service value based on user expectations and a user tolerance level from the content and a user profile, and delivering a modified version of the content to the user based on the quality of service value. The system is a computing device programmed with instructions to accomplish these functional steps.

18 Claims, 7 Drawing Sheets

(56) References Cited

U.S. PATENT DOCUMENTS

| | | | |
|---|---|---|---|
| 7,890,601 B2 * | 2/2011 | Schaeck | 709/217 |
| 7,975,020 B1 * | 7/2011 | Green et al. | 709/217 |
| 8,166,167 B2 * | 4/2012 | Prasad et al. | 709/226 |
| 8,185,837 B2 * | 5/2012 | Liu et al. | 715/764 |
| 8,346,956 B2 * | 1/2013 | Day et al. | 709/231 |
| 8,375,304 B2 * | 2/2013 | Swenson et al. | 715/738 |
| 8,392,615 B2 * | 3/2013 | Visharam et al. | 709/246 |
| 8,407,313 B2 * | 3/2013 | Ritter et al. | 709/217 |
| 8,429,249 B2 * | 4/2013 | Yuan | 709/219 |
| 8,539,019 B2 * | 9/2013 | Round | 709/203 |
| 8,606,911 B2 * | 12/2013 | Raleigh et al. | 709/224 |
| 8,606,917 B2 * | 12/2013 | Short et al. | 709/225 |
| 8,615,583 B2 * | 12/2013 | Plamondon | 709/225 |
| 2004/0098451 A1 * | 5/2004 | Mayo | 709/203 |
| 2005/0050301 A1 * | 3/2005 | Whittle et al. | 712/32 |
| 2007/0220103 A1 * | 9/2007 | Rogers et al. | 709/217 |
| 2008/0016458 A1 * | 1/2008 | Good et al. | 715/780 |
| 2009/0234857 A1 * | 9/2009 | Barault et al. | 707/9 |
| 2010/0082561 A1 * | 4/2010 | Rauber | 707/695 |
| 2010/0269093 A1 * | 10/2010 | Walsh | 717/107 |
| 2010/0299274 A1 * | 11/2010 | Rappaport | 705/313 |
| 2011/0004649 A1 * | 1/2011 | Nord et al. | 709/202 |
| 2011/0197124 A1 * | 8/2011 | Garaventa | 715/234 |
| 2011/0283011 A1 * | 11/2011 | Li et al. | 709/231 |
| 2012/0023395 A1 * | 1/2012 | Pieczul et al. | 715/234 |
| 2012/0060078 A1 * | 3/2012 | Beauchamp et al. | 715/201 |
| 2012/0084455 A1 * | 4/2012 | McCue et al. | 709/231 |
| 2012/0197718 A1 * | 8/2012 | Martchenko et al. | 705/14.53 |
| 2012/0210381 A1 * | 8/2012 | Ozawa | 725/114 |
| 2012/0233247 A1 * | 9/2012 | Ashrafi | 709/203 |
| 2012/0297021 A1 * | 11/2012 | Channabasavaiah et al. | 709/217 |
| 2013/0028088 A1 * | 1/2013 | Do et al. | 370/235 |
| 2013/0031073 A1 * | 1/2013 | Mercer et al. | 707/705 |
| 2013/0080242 A1 * | 3/2013 | Alhadeff et al. | 705/14.39 |
| 2013/0132519 A1 * | 5/2013 | Walsh et al. | 709/217 |
| 2013/0305299 A1 * | 11/2013 | Bergstrom et al. | 725/93 |

OTHER PUBLICATIONS

Bouch, Anna et al. "Quality is in the Eye of the Beholder: Meeting User's Requirements for Internet Quality of Service," Proceedings of the SIGCHI Conference on Human Factors in Computing Systems, 2000, pp. 297-304.*

Lum, Wai Yip and Lau, F.C.M. "A Context-Aware Decision Engine for Content Adaptation," IEEE Pervasive Computing, vol. 1, Issue 3, Jul.-Sep. 2002, pp. 41-49.*

Skorin-Kapov, L. et al. "Application-Level QoS Negotiation and Signaling for Advanced Multimedia Services in the IMS," IEEE Communications Magazine, vol. 45, Issue 7, Jul. 2007, pp. 108-116.*

\* cited by examiner

FIG 3B

Infosys

Win in the flat world

Infosys ranked among Best Companies for Leaders: Survey
☐ Read 1  2  3  4  5  6  7  8  9  10

Campus Connect
Infosys Industry-Academia partnership

InStep
Infosys Global Internship program

Infosys Foundation
Working towards a more equitable society

Infosys Prize
Infosys Science Foundation honors excellence in research

310b →

Opinions

An Obvious Choice
Read | Discuss

Whose Brand Is It Anyway?
Read | Discuss

Look What Google Did to Your TV!
Read | Discuss

Leadership Is Small and Beautiful
Read | Discuss

Social Retail: The Age of Consumer Conversations
Read | Discuss

Q1 Results
Infosys to announce Q1 results
Press Release | More

Postcards from Davos: Blogs and views from Infosys leaders
Read

Infosys Offerings
Industries
Consulting Services
IT Services
Engineering Services
BPO Services
Products and Platforms

Infosys Global
Country
Language

Blogs and Microsites
All Blogs
All Microsites

Search  [GO]

← 300b

Copyright © 2010 Infosys Technologies Limited

SYSTEM AND METHOD FOR DYNAMICALLY MODIFYING CONTENT BASED ON USER EXPECTATIONS

This application claims the benefit of Indian Patent Application Filing No. 1217/CHE/2011, filed Apr. 7, 2011, which is hereby incorporated by reference in its entirety.

BACKGROUND OF THE INVENTION

1. Field of the Invention

The present invention relates to content delivery, and in particular, systems and methods for modifying content to provide content in accordance with user expectations.

2. Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Description of Related Art

In recent years, the Internet has developed universal appeal as a primary source of content for millions of individuals. Web pages exist for nearly every possible topic of interest, and can be used by individuals for everything from entertainment to education, information exchange to online dating, and everything in between. As a result of the ever-increasing number individuals turning to the Internet, users have to wait for a longer and longer duration for web content to load. This can be attributed to any of a variety of external factors, including available bandwidth, application used, server load, device capability, etc. Such delays lead to frustration and an overall poor user expensive while attempting to access web content.

Some websites have attempted to ease this frustration by offering multiple versions of their websites. The versions may range from plain text to fully interactive content, and anywhere in between. The version of the website is automatically selected for the user and displayed to the user requesting the website. The website version is selected based on a variety of factors, such as the type and specifications of the device being used to request the content, the types of software available on the device, and the speed of the network connection linking the device to the website.

A common example of these offerings are websites with versions made specifically for mobile devices, such as the m.google.com website. When accessed by a mobile device, users attempting to access www.google.com are automatically redirected to its mobile counterpart. These versions made specifically for mobile devices are often much simpler than their computer-user-directed counterparts, containing primarily text with few, if any, graphics, and very limited running scripts integrated into the website.

Despite their convenience, these conventional methods of modifying content only take into account static information gleaned from the user's mobile device, and do not consider factors specific to any individual. Thus, all users of a given device are clustered in one group and are delivered the same webpage.

SUMMARY OF THE INVENTION

This non-discriminatory grouping of conventional methods is extremely restricted, as it is based on the underlying assumption that all users of a given device are satisfied by simple, fast-loading web pages, which fail to address individual users' desires, preferences and expectations. Furthermore, the conventional systems do not consider situations in which users' expectations are not in line with the underlying assumptions. For example, a photographer may prefer that a requested website contain all available graphics regardless of the load time.

Thus, there is a need in the art for systems and methods for delivering content in a way that maximizes user experience and minimizes frustration while accessing web content. This invention meets those needs and others by providing systems and methods for dynamically rendering content based on user expectations and user tolerance levels. Because every user's expectations and tolerance levels are different, embodiments of the invention exploit these two parameters to deliver optimized web content to users within an acceptable time frame, thus ensuring a better browsing experience.

In one embodiment of the invention, the method includes intercepting at a computing device a request for content to be delivered from a server, determining a quality of service value based on user expectations and a user tolerance level from the content and a user profile, and delivering a modified version of the content to the user based on the quality of service value. The system is a computing device programmed with instructions to accomplish these functional steps.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3b is an exemplary screen shot of a modified version of the content of FIG. 3a according to one embodiment.

DETAILED DESCRIPTION

A system and method for dynamically modifying content based on user expectations is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement. In some instances, well-known structures and devices are shown in block diagram form in order to avoid unnecessarily obscuring the preferred embodiment.

Figure 1:
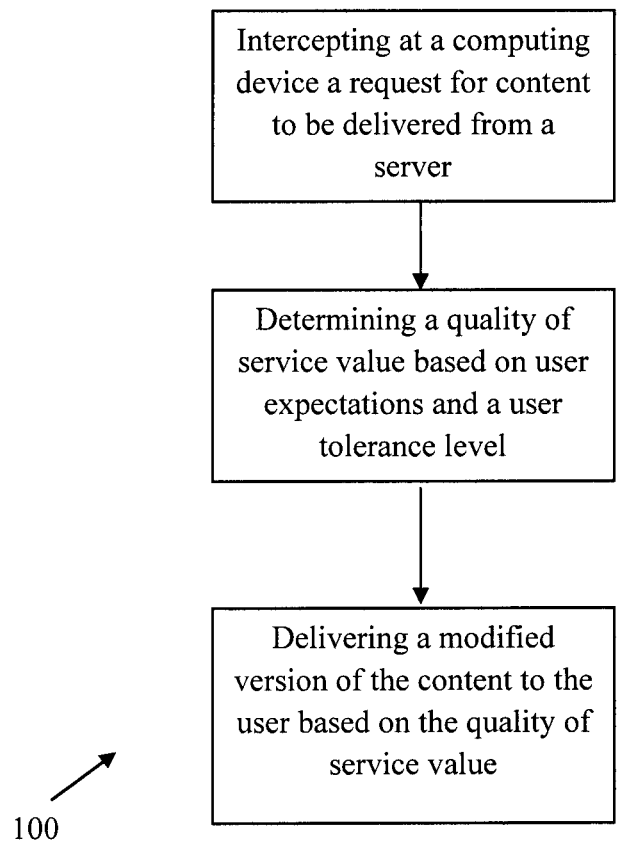
FIG. 1 is a flowchart illustrating the method according to one embodiment.

Referring now to the drawings, wherein like reference numerals designate identical or corresponding parts throughout the several views, FIG. 1 is a flowchart 100 illustrating a method for dynamically rendering content based on user expectations, according to one embodiment. At processing block 110, a request for content from a server is intercepted at a computing device. The computing device can be a third party device physically independent of both the requesting user and the server, or can be integrated into one, the other, or both of the devices. The computing device acts as a middle-man, or "middleware" device, between the end user and the server, and intercepts requests between the two devices. The content can be any type of content available on the web including, but not limited to, web pages, forms, multimedia, streaming content, e-mails, games, and the like. The content requested from the server is referred to interchangeably herein as the "requested content" and the "original content", for the sake of explanation and to avoid confusion.

A user profile is established for users requesting content from the server, and is maintained by the middleware device for an indefinite amount of time. User profile data can be comprised of static information, dynamic information, or both. Static information is generally obtained explicitly by requesting the information from the user, and includes demographic information, such as age, gender, and location of the user, as well as interest information, such as hobbies and premium subscriptions. Dynamic information is obtained implicitly by observing usage patterns, and comprises the user's time of use, duration of use, frequency of used, frequently (or infrequently) accessed services, feedback provided, and any survey data collected representing the user's opinions on various topics. User profile data can be obtained in various known ways, such as through user questionnaires or by monitoring user activity.

User expectations and a user tolerance level can be implied from the user profile and the type of content requested by the user. The user expectations define specifications for a modified version of the content to be presented to the user. In a first example, a user profile may show that a user has a paid premium subscription to a photo sharing website, and the content requested may be a streaming photo slideshow. In this example, user expectations for high quality images may be implied based on the user's interest in photography and his desire to view a slideshow.

The user tolerance level defines an accepted latency time for delivered content, and can also be implied from the user profile and type of requested content. In a second example, a user profile may show that the user has a high speed internet connection, and the content requested may be a text-only web page having only graphical advertisements. In this example, the user tolerance level would be very low, as a user of high speed internet would likely not expect to wait long for a simple page to load.

Based on the user profile and the type of content requested, the middleware device establishes a quality of service value that matches these user expectations and the user tolerance level at processing block 120. For ease of explanation and illustration, the quality of service values described herein are assigned on a scale from 0-10, 0 representing minimal user expectations and a low user tolerance level (i.e., short waiting time), and 10 representing maximum user expectations and a high user tolerance level (i.e., long waiting time). It is contemplated, however, that the quality of service value can be numerical, alphabetical, symbolic, or in any other form representative of differing levels of quality. Further, the quality of service value may involve any number of variables and/or relations between data. For example, the quality of service value may be assigned inversely on a scale from 0-10, 0 representing minimal user expectations and a high tolerance level (i.e., long waiting time), and 10 representing maximum user expectations and a low tolerance level (i.e., short waiting time). Furthermore, quality of service values may be calculated according to a plurality of methods in a plurality of forms in order to compare results to confirm the accuracy of the value with respect to the user expectations and tolerance level.

In the first example described above, a quality of service value of 9 may be assigned to the user's request, and represent that the user is willing to wait longer in order to have his expectation of high quality images met. In the second example, a quality of service value of 1 may be assigned to that user's request, and represent that the user is not willing to wait for any significant amount of time for the content to load, because (a) he has high-speed internet, and (b) the primary content of the requested web page contains no graphics at all.

Based on this quality of service value, a modified version of the content is delivered to the user at processing block 130. Alternative to being a faster loading and/or simplified version of the original content, as is described primarily herein, the modified version of the content may instead be a copy of the original content (such as may be the case in the first example above, where the user would likely rather wait longer for the high quality images contained in the original content than quickly receive modified content having lower resolution images); a lateral version of the content reflecting only nominal changes in content size, media, or structure (such as translated content or corrected content resolving typographical errors, grammatical errors, and/or factual errors); or an enhanced version of the content having additional content not present in the original content (such as integrated content from multiple sources across one or more types of media, e.g., a children's game enhanced with word definitions, an encyclopedia article enhanced with pictures and video, etc.).

In one embodiment of processing block 130, the content is modified by the same server providing the content, and the modified content is delivered directly from the server to the user. For example, if the user's request is assigned a very low quality of service value, the middleware device may request the server to send a low resolution copy of the website directly to the user in order to expedite the delivery of the website. In this situation, the middleware device better meets this particular user's expectations and tolerance level by removing itself from the delivery process.

In another embodiment, the requested content is downloaded from the server to a cache at the middleware device, where it is modified based on the quality of service value before being delivered to the user. For example, if the user's request is assigned a quality of service value of 5, representing that the user wants a balance of quality and efficiency, the middleware device may download the requested content and modify it to medium resolution before delivering it to the user. Thus, the user has sacrificed only some quality, but gained a faster delivery time due to the smaller transmission size.

Figure 2:
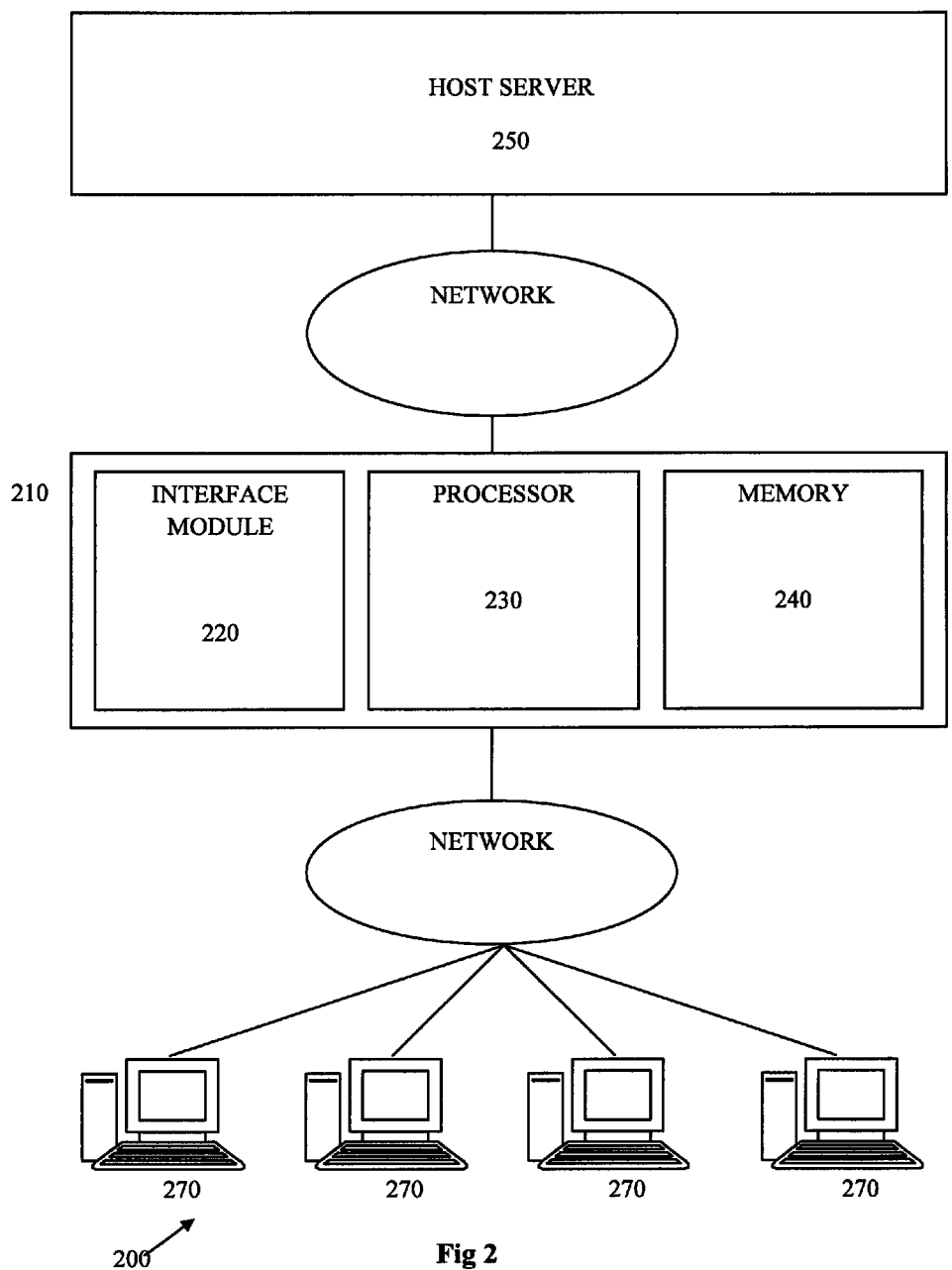
FIG. 2 is a system for effecting the method according to one embodiment.

FIG. 2 illustrates system 200 of an embodiment for effecting the functions described above. A middleware device (in this case, middleware server 210) is connected over network 260 to host server 250 and a plurality of user systems 270. Middleware server 210 includes interface module 220, processor 230 and memory 240, which are all in communication with one another. Middleware server 210 is configured to dynamically render content based on the individual expectations of users at user systems 270. Middleware server 210 is typically a computer system, and may be an HTTP (Hypertext Transfer Protocol) server, such as an Apache server. Middleware server 210 may be built using a standard LAMP or other solution stack. Memory 240 may be any type of storage media, such as tangible computer readable media, that may be volatile or non-volatile memory such as, for example, read-only memory (ROM), random access memory (RAM), magnetic disk storage media, optical storage media, flash memory devices, and zip drives. Network 260 may be a local area network (LAN), wide area network (WAN), a telephone network, such as the Public Switched Telephone Network (PSTN), an intranet, the Internet, or combinations thereof. The plurality of user systems 270 may be mainframes, minicomputers, personal computers, laptops, personal digital assistants (PDAs), cell phones, netbooks, thin clients, and/or other computing devices. The plurality of user systems 270 are characterized in that they are capable of being connected to network 260. The plurality of user systems 270 typically include web browsers.

In use, when a user of one of the plurality of user systems 270 wants to view content from host server 250 according to his or her expectations and tolerance level, as described above, a request is for content from host server 250 is intercepted at interface module 220 of middleware server 210 over network 260. For example, a signal is transmitted from one of the user systems 270, the signal having a destination address (i.e., address representing the host server), a query (i.e., a request for content), and a return address (i.e., address representing the user system that initiated the query).

In one embodiment, interface module 220 intercepts the request and accesses host server 250 via network 260 to retrieve the requested content from host server 250. Memory 240 caches the retrieved content. Simultaneously or consecutively in any order, processor 230 determines a quality of service value based on user expectations and a user tolerance level from the content and a user profile, as described above. In one embodiment, the user profile has been previously created and stored, and can be retrieved from memory 240 and updated. In another embodiment, the user profile has not been previously created, previously stored, or both. In this case, the user profile may be created using static and/or dynamic information, as described above. In either embodiment, processor 230 analyzes the user profile along with the retrieved content to determine a quality of service value indicative of the user's inferred expectations and tolerance level.

Interface module 220 delivers a modified version of the content to the requesting user. In this embodiment, the cached content in memory 240 is modified by processor 230 according to the quality of service value. The modified content is then delivered from interface module 220 to the user over network 260. For example, a reply signal may be transmitted to the user by interface module 220 that includes a destination address corresponding to the return address of the user system, and a modified version of the requested content responsive to the query, taking into account the quality of service value.

In another embodiment, middleware server 210 performs no modifications of the requested content; instead, interface module 220 formulates a request for modified content from host server 250 based on the calculated quality of service value. The request specifies that the modified content be delivered directly to the user. In other words, a signal is generated and transmitted from interface module 220, the signal having a destination address (i.e., address representing the host server), a query (i.e., a request for modified content), and a return address (i.e., address representing the user system).

If readily available from host server 250, the modified content is delivered directly from host server 250 to the user over network 260. For example, a reply signal may be transmitted to the user by host server 250 that includes a destination address corresponding to the return address of the user system, and a modified version of the requested content responsive to the query, taking into account the quality of service value.

If the modified content is not readily available from host server 250, host server 250 may modify the original content to meet the quality of service requirements specified by interface module 220's request, and transmit the modified content to the user over network 260. In these embodiments, the original content is requested and accessed from host server 250 for analysis by processor 230 in conjunction with the user profile to determine the quality of service value prior to modification. However, it is not necessary in this embodiment that the originally requested content be stored in memory 240, as the modified content is produced at host server 250 and directly transmitted to the user.

Alternatively, host server 250 may return a failure message to interface module 220. In this embodiment, upon receipt of a failure message, interface module 220 requests the original version of the content from host server 250, if not previously requested; memory 240 caches the content, if not previously cached; and processor 230 modifies the cached content according to the quality of service value. The modified content is then delivered from interface module 220 to the user at one of the plurality of user systems 270 over network 260.

In yet another embodiment, host server 250 may have a modified version of the content only partially responsive to the quality of service requirements specified by interface module 220's request (hereinafter referred to as "partially responsive content"). In this situation, host server 250 may (a) modify the partially responsive content to fully meet the quality of service value, then transmit the modified content directly to the user, or (b) return a failure message.

In this embodiment, upon receipt of a failure message, interface module 220 may request the partially responsive content from host server 250, if not previously requested; cache the partially responsive content in memory 240, if not previously requested; and modify the cached partially responsive content in processor 230 according to the quality of service value. Thus, modified content fully compliant with the quality of service value is produced, and delivered to the user by interface module 220 over network 260.

Alternatively, upon receipt of a failure message, interface module 220 may request the original version of the content from host server 250, if not previously requested; cache the content in memory 240, if not previously cached; and modify the cached content according to the quality of service value. The modified content is then delivered from interface module 220 to the user at one of the plurality of user systems 270 over network 260.

In each of these embodiments, the original and/or modified content, if stored, can be erased from memory 240 upon successful modification and delivery of the content to the user, or may be stored indefinitely for future use. Functions of each of the described and other embodiments can be described as modules of computer executable instructions recorded on tangible media. The modules can be segregated in various manners over various devices.

Figure 3A:
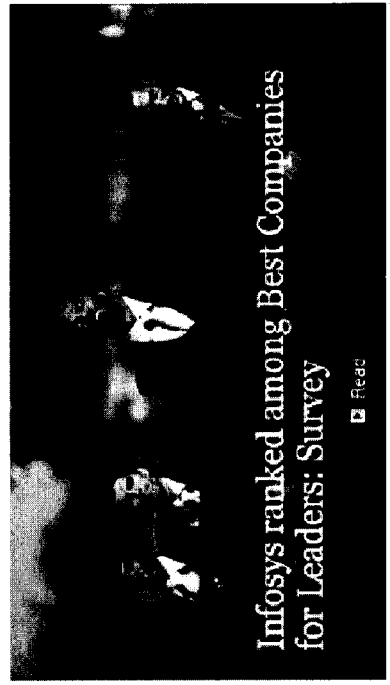
FIG. 3a is an exemplary screen shot of content requested from a server by a user according to one embodiment.

Turning now to FIG. 3a, exemplary screen shot of content 300a requested from a server by a user according to one embodiment. In this example, the requested content is a website for a consulting company, the website consisting of text, links, graphics, and photograph slideshow 310a, totaling 680 kilobytes in size.

Using the requested content, described above, and a user profile of the user who requested the website, described below, the computing device infers user expectations and a user tolerance level. In this example, the user profile may indicate that the user is a middle-aged male lawyer from Washington, D.C., who primarily accesses the internet for business purposes. Further, the user profile may indicate that the user is requesting content 300a on a Wednesday morning at 11:00 AM, from a computer connected to a high-speed internet source registered to a downtown Washington, D.C. law firm. The user profile may further indicate that the user visited several websites for other consulting companies within the 10 minutes prior to requesting content 300a, and spent most of his time reading the "Newsroom" articles posted on those websites. He did not visit any other websites during that time period.

Based on the content requested and the user profile information, the system may infer user expectations for an informative website that can be easily and efficiently navigated for company news. The user tolerance level may be calculated as, for example, 2 seconds, indicating that the user finds it acceptable to wait for 2 seconds between the time he submits the request for content, and the time that requested or modified content is delivered.

A quality of service value is then determined and assigned based on the user expectations and user tolerance level. On a scale of 0 to 10, wherein 0 represents minimal user expectations and a low user tolerance level and 10 represents maximum user expectations and a higher user tolerance level, the system may assign the user a quality of service value of 5, indicating that the user has average expectations and/or an average user tolerance level.

Based on this quality of service value, modified content 300b of FIG. 3b is delivered to the user. In this example, photograph slideshow 310b is reduced in size with respect to original photograph slideshow 310a, and reduces the page size to 310 kilobytes. This reduction allows the website to load more quickly by reducing a feature having a large file size that is of probable little importance to the user, without sacrificing the website's easy-to-navigate layout.

Alternatively, suppose, for example, that the user profile for the same user instead indicates that the user is requesting content 300a from a mobile device connected to a slow-performing mobile network with spotty coverage in the Washington, D.C. area. All other information in the user profile remains the same. Based on the content requested and the user profile information, the system may infer user expectations for an informative website that can be easily and efficiently navigated on a mobile device for company news. The user tolerance level may still be calculated at 2 seconds, indicating that the user finds it acceptable to wait for 2 seconds between the time he submits the request for content on his mobile device, and the time that the requested or modified content is delivered to the mobile device.

On the scale of 0 to 10 discussed above, wherein 0 represents minimal user expectations and a low user tolerance level and 10 represents maximum user expectations and a higher user tolerance level, the system may now assign the user a quality of service value of 2, indicating that the user has lower than average expectations and/or a lower than average user tolerance level. This indicates that the user wants the website to load fast and contain primarily only essential information.

Figure 3C:
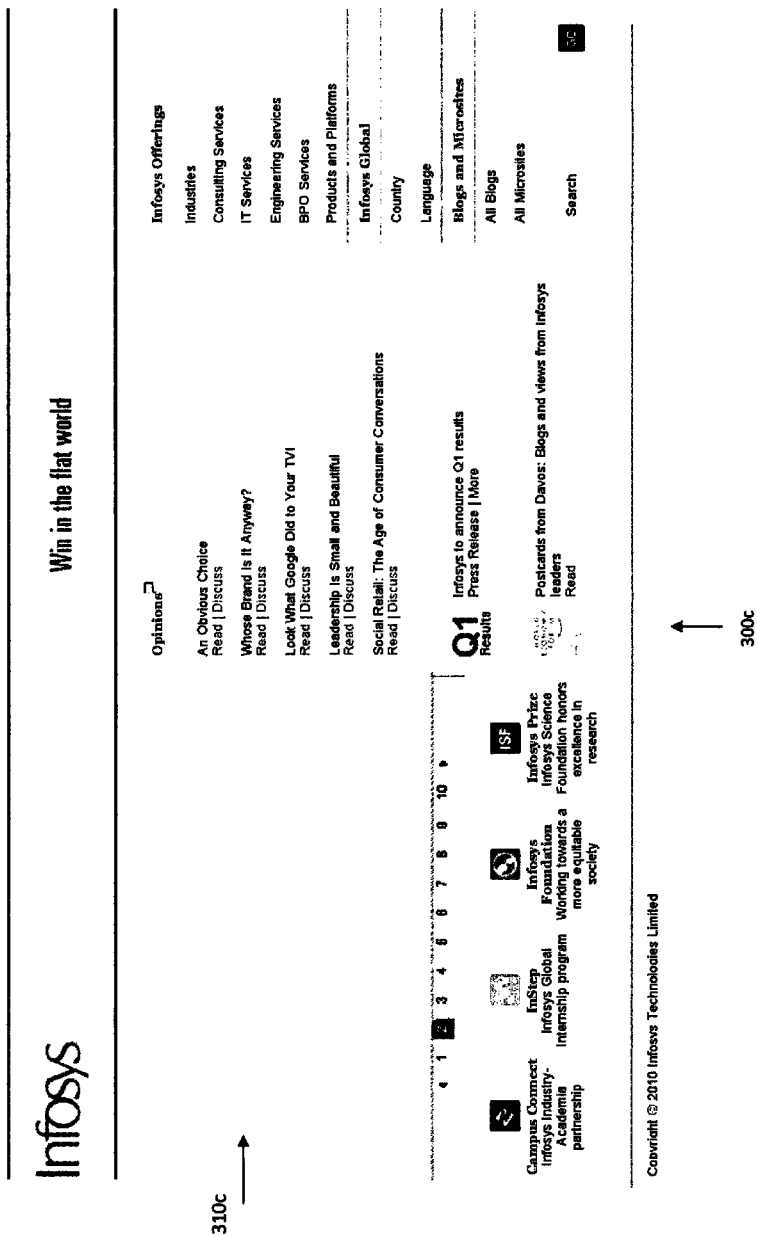
FIG. 3c is an exemplary screen shot of another modified version of the content of FIG. 3a according to one embodiment.

Based on this quality of service value, modified content 300c of FIG. 3c is delivered to the user. In this example, photograph slideshow 310c is removed entirely, reducing the page size to 80 kilobytes. This allows the website to load quickly on the user's mobile device by entirely removing a feature having a large file size that is of probable little importance to the user, without sacrificing the website's easy-to-navigate layout and efficient access to news items.

FIGS. 3b and 3c illustrate two methods of modifying media content to comply with a quality of service value: reducing the dimensions of a piece of media content and completely excluding a piece of media content, respectively. Other methods of modifying media content include transcoding the content to a lower quality, converting colored content to grayscale, summarizing or sampling the content, etc. Media content includes images, audio content, video content, etc.

HTML construct content may alternatively or additionally be modified to comply with a quality of service value. For example, a table of data can be rendered record by record into a basic format. Optional fields can be removed from forms, or forms can be paginated. Normal text can be summarized or sampled. Further, formatting can be removed completely so that the page displays as plain text only.

These examples are for illustration only and are not intended to be an exhaustive list of possibilities. One skilled in the art will recognize that there are an innumerable number of methods for modifying content, not only to reduce overall file size and content features as described above, but also to enhance overall file size and content features.

Figure 4:
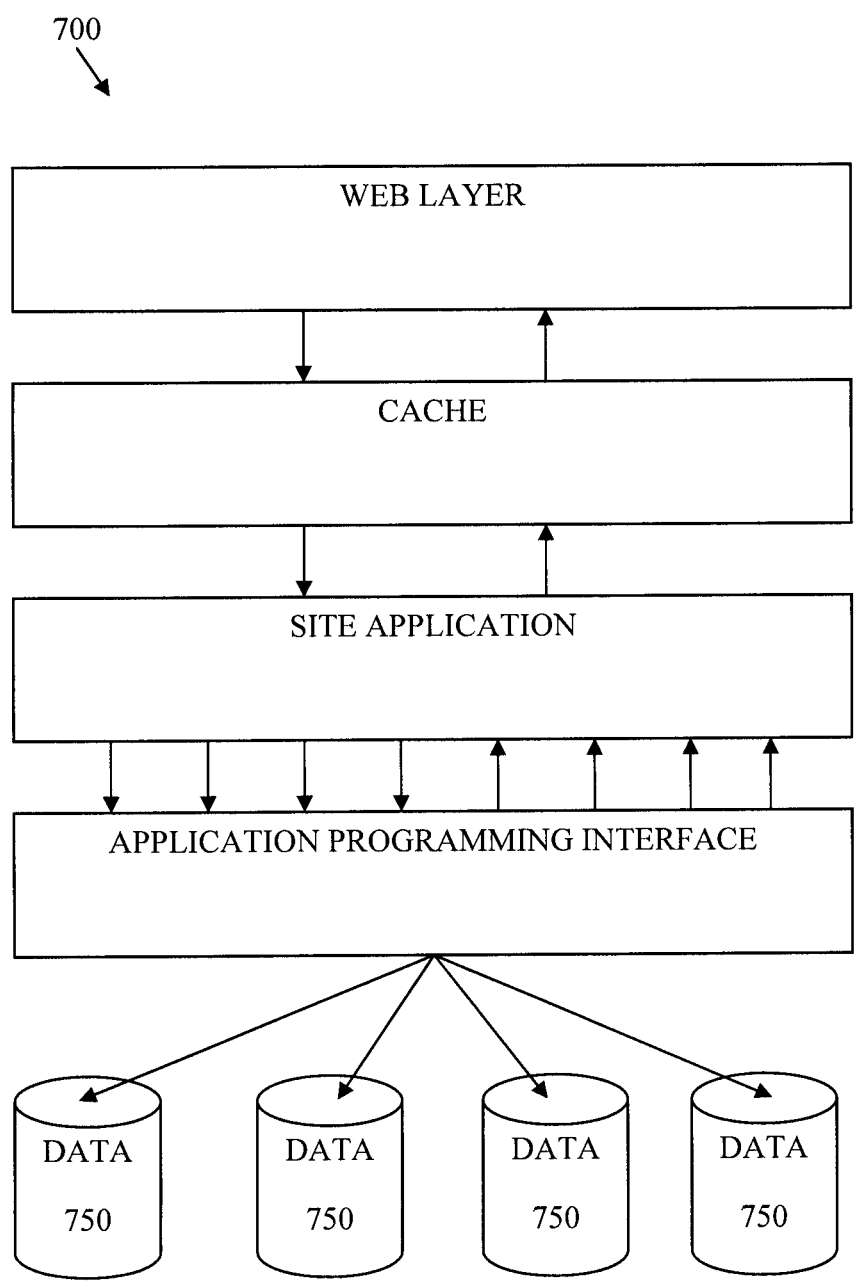
FIG. 4 is a block diagram of an exemplary computer system for performing the method according to one embodiment.
Figure 5:
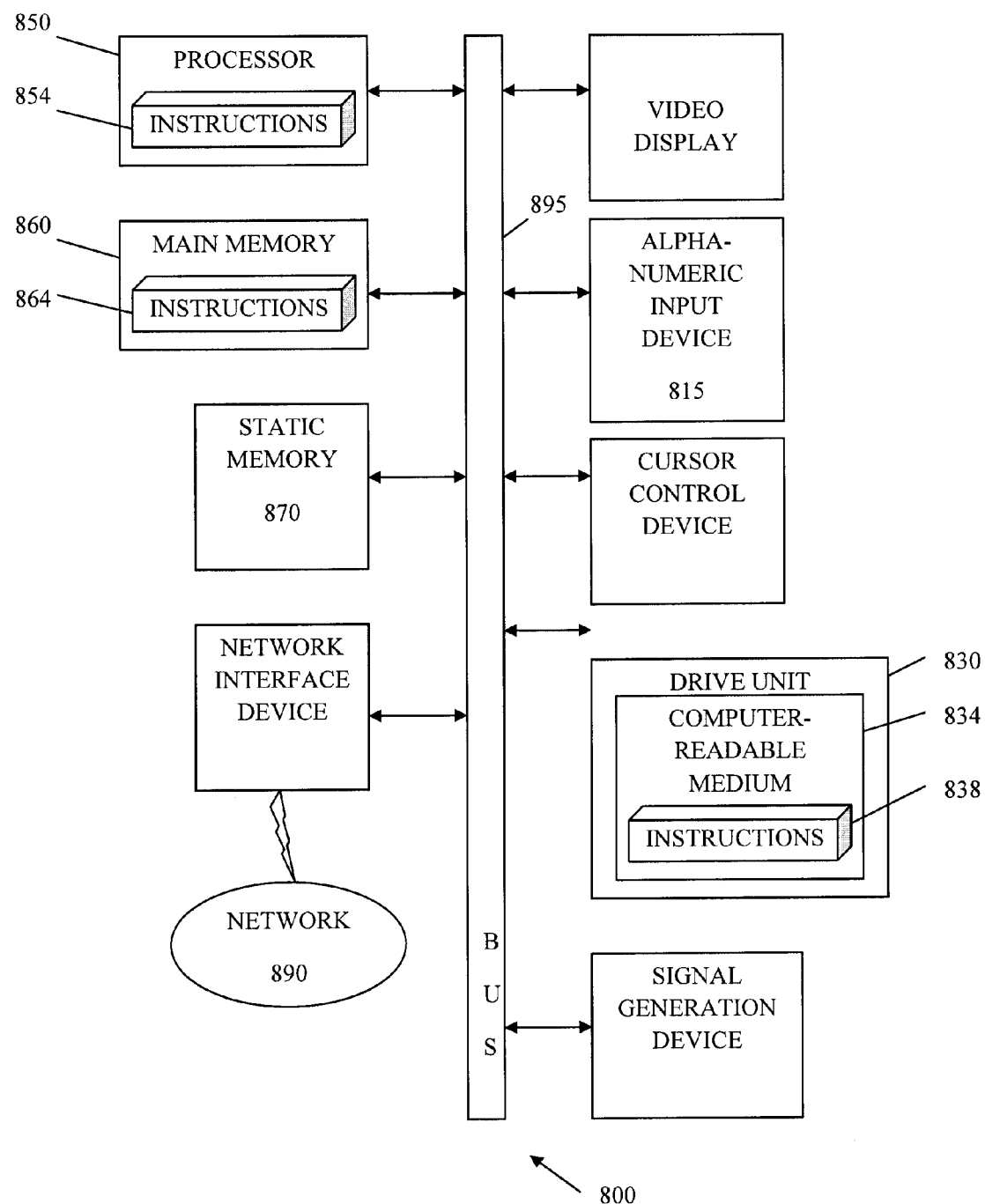
FIG. 5 is schematic diagram of an exemplary computer system according to one embodiment.

As shown in FIG. 4, system architecture 700 for performing the method described above according to an embodiment includes web layer 710, cache 720, site application 730, application programming interface 740, and a plurality of data stores 750. It will be appreciated that the system architecture may vary from the illustrated architecture. For example, web layer 710 may directly access data stores 750, the site application may directly access data stores 750, system architecture 700 may not include cache 720, etc., as will be appreciated by those skilled in the art. Web layer 710 is configured to intercept a request for content from a server through a web browser, and deliver a modified version of the content reflecting an expected quality of service. Web layer 710 communicates the user request to cache 720. Cache 720 is configured to temporarily store requested content, modified content, and/or user profiles that are accessed frequently by web layer 710 and can be rapidly accessed by web layer 710. In one embodiment, cache 720 may be a caching proxy server. Cache 720 communicates the user requests to site application 730.

Site application 730 is configured to update cache 720 and to process user requests for content received from web layer 719. Site application 730 may analyze the requested content and the user profile to draw conclusions about the user's expectations and the user tolerance level, and to calculate a quality of service value based on these conclusions. Site application 730 can then convert the request for content into a request for modification of the requested content and transmit this request to application programming interface 740. Application programming interface 740 is configured to access data from the plurality of data stores 750 to collect the requested content responsive to the plurality of requests from site application 730. The plurality of data stores 750 may include, for example, web pages, multimedia, and the like. It will be appreciated that in alternative embodiments only one data store 750 may be provided to store the data.

The data in data stores 750 is provided to application programming interface 740, which provides the content to site application 730. Site application 730 updates cache 720 with the requested content, modifies the content based on the quality of service value, and delivers the modified content to web layer 710, which delivers browsable content to the user.

FIG. 4 shows a diagrammatic representation of a machine in the exemplary form of computer system 800 within which a set of instructions, for causing the machine to perform any of the one or more methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 800 includes processor 850 (e.g., a central processing unit (CPU), a graphics processing unit (GPU) or both), main memory 860 (e.g., read only memory (ROM), flash memory, dynamic random access memory (DRAM) such as synchronous DRAM (SDRAM) or Rambus DRAM (RDRAM), etc.) and static memory 870 (e.g., flash memory, static random access memory (SRAM), etc.), which communicate with each other via bus 595.

Computer system 800 may further include video display unit 810 (e.g., a liquid crystal display (LCD) or a cathode ray tube (CRT)). Computer system 800 also includes alphanumeric input device 815 (e.g., a keyboard), cursor control device 820 (e.g., a mouse), disk drive unit 830, signal generation device 840 (e.g., a speaker), and network interface device 880.

Disk drive unit 830 includes computer-readable medium 834 on which is stored one or more sets of instructions (e.g., software 838) embodying any one or more of the methodologies or functions described herein. Software 838 may also reside, completely or at least partially, within main memory 860 and/or within processor 850 during execution thereof by computer system 800, main memory 860 and processor 850 also constituting computer-readable media. Software 838 may further be transmitted or received over network 890 via network interface device 880.

While computer-readable medium 834 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method for dynamically rendering content, the method comprising:
    intercepting at a middleware computing device a request from a user system for content to be delivered from a server, the user system associated with a user;
    determining at the middleware computing device one or more user expectations and a user tolerance level based on a type of the content and a user profile for the user;
    determining at the middleware computing device a quality of service value based on the one or more user expectations and the user tolerance level, wherein the one or more user expectations correspond with one or more content specifications and the user tolerance level; and
    delivering at the middleware computing device a modified version of the content to the user system comprising at least one of:
        retrieving the content from the server and generating the modified version of the content based on the quality of service value; or
        retrieving the modified version of the content from the server based on the quality of service value.

2. The method of claim 1, wherein the user tolerance level comprises an indication of an accepted latency time for the user.

3. The method of claim 1, wherein the user profile comprises at least one of static information or dynamic information.

4. The method of claim 3, wherein the static information comprises at least one of the user's age, gender, location, or subscriptions.

5. The method of claim 3, wherein the dynamic information is obtained by observing usage patterns, and comprises at least one the user's time of use, frequency of use, accessed services, feedback, or survey data.

6. The method of claim 1, wherein the content is requested by a user of the user system over a mobile network and delivered to the user on a display of the user system.

7. A middleware computing device comprising:
    a processor coupled to a member and configured to execute instructions stored in the memory, comprising:
        intercepting a request from a user system for content to be delivered from a server, the user system associated with a user;
        determining one or more user expectations and a user tolerance level based on a type of the content and a user profile for the user;

determining a quality of service value based on the one or more user expectations and the user tolerance level, wherein the one or more user expectations correspond with one or more content specifications and the user tolerance level comprises an indication of an acceptable latency for the user; and delivering a modified version of the content to the user system comprising at least one of:
retrieving the content from the server and generating the modified version of the content based on the quality of service value; or
retrieving the modified version of the content from the server based on the quality of service value.

8. The device of claim 7, wherein the user tolerance level comprises an indication of an accepted latency time for the user.

9. The device of claim 7, wherein the user profile comprises at least one of static information or dynamic information.

10. The device of claim 9, wherein the static information comprises at least one of the user's age, gender, location, or subscriptions.

11. The device of claim 9, wherein the dynamic information is obtained by observing usage patterns, and comprises at least one the user's time of use, frequency of use, accessed services, feedback, or survey data.

12. The device of claim 7, wherein the content is requested by a user of the user system over a mobile network and delivered to the user on a display of the user system.

13. A non-transitory machine readable medium having stored thereon instructions for dynamically rendering content comprising machine executable code which when executed by a machine, causes the machine to perform steps comprising:
intercepting a request from a user system for content to be delivered from a server, the user system associated with a user;
determining one or more user expectations and a user tolerance level based on a type of the content and a user profile for the user;
determining a quality of service value based on the one or more user expectations and the user tolerance level, wherein the one or more user expectations correspond with one or more content specifications and the user tolerance level comprises an indication of an acceptable latency for the user; and
delivering a modified version of the content to the user system comprising at least one of:
retrieving the content from the server and generating the modified version of the content based on the quality of service value; or
retrieving the modified version of the content from the server based on the quality of service value.

14. The medium of claim 13, wherein the user tolerance level comprises an indication of an accepted latency time for the user.

15. The medium of claim 13, wherein the user profile comprises at least one of static information or dynamic information.

16. The medium of claim 15, wherein the static information comprises at least one of the user's age, gender, location, or subscriptions.

17. The medium of claim 15, wherein the dynamic information is obtained by observing usage patterns, and comprises at least one the user's time of use, frequency of use, accessed services, feedback, or survey data.

18. The medium of claim 13, wherein the content is requested by a user of the user system over a mobile network and delivered to the user on a display of the user system.

* * * * *